United States Patent [19]

Keller et al.

[11] Patent Number: 5,697,294
[45] Date of Patent: *Dec. 16, 1997

[54] DEVICE FOR COMPRESSING TIRES FOR SHIPMENT IN CONTAINERS

[76] Inventors: Michael Keller; Gerald Wheeler, both of 550 S. Alameda St., Compton, Calif. 90221

[21] Appl. No.: 672,574

[*] Notice: The term of this patent shall not extend beyond the expiration date of Pat. No. 5,544,578.

[22] Filed: Jun. 28, 1996

Related U.S. Application Data

[63] Continuation of Ser. No. 299,742, Sep. 1, 1994, Pat. No. 5,544,578.

[51] Int. Cl.⁶ ........................................... B30B 5/00
[52] U.S. Cl. ........................ 100/100; 53/436; 53/527; 100/218
[58] Field of Search .................... 53/436, 523, 527; 100/12, 100, 218, 219, 220, 232, 265, 295; 414/661, 907

[56] References Cited

U.S. PATENT DOCUMENTS

| | | |
|---|---|---|
| 3,157,301 | 11/1964 | McWilliams . |
| 3,252,737 | 5/1966 | Seaton . |
| 3,557,683 | 1/1971 | Boyd . |
| 3,822,526 | 7/1974 | Black . |
| 3,834,290 | 9/1974 | Nelson . |
| 3,850,295 | 11/1974 | Black . |
| 3,908,539 | 9/1975 | O'Brien . |
| 4,140,052 | 2/1979 | Meier . |
| 4,162,603 | 7/1979 | Stromberg . |
| 4,249,843 | 2/1981 | Kerr . |
| 4,547,112 | 10/1985 | Steinhart . |
| 4,559,870 | 12/1985 | Krummacher . |
| 4,608,808 | 9/1986 | Ryan et al. . |
| 4,777,781 | 10/1988 | Doster et al. . |
| 4,858,415 | 8/1989 | Hake . |
| 4,880,350 | 11/1989 | Stobb . |
| 4,920,729 | 5/1990 | Doster et al. . |
| 5,092,106 | 3/1992 | Doster et al. . |

FOREIGN PATENT DOCUMENTS

| | | |
|---|---|---|
| 2345415 | 3/1975 | Germany . |
| 2722208 | 11/1978 | Germany . |
| 1457472 | 12/1976 | United Kingdom . |
| 1457473 | 12/1976 | United Kingdom . |
| 1588914 | 4/1981 | United Kingdom . |

*Primary Examiner*—David Scherbel
*Assistant Examiner*—Terrence Till
*Attorney, Agent, or Firm*—Oppenheimer Poms Smith

[57] ABSTRACT

A device for compressing tires and other compressible items in a shipping container comprises a support frame 22 attached to the lift end of a forklift. A fixture 20 is attached to and moves vertically with the support frame. The fixture comprises a horizontal compression platen 30. A vertical pusher plate 50 extends above and below the platen. The upper pusher plate 53, which is above the platen, can fold down so that the platen can be brought near the ceiling of a shipping container above a stack of tires. The fixture weighs enough to compress tires stacked below the compression platen. Additional tires are stacked above the platen and compressed tires. The upper pusher plate is then folded up, against the tires. Two hydraulic cylinders push the pusher plate away from the support frame to pull the platen from between the tires.

7 Claims, 5 Drawing Sheets

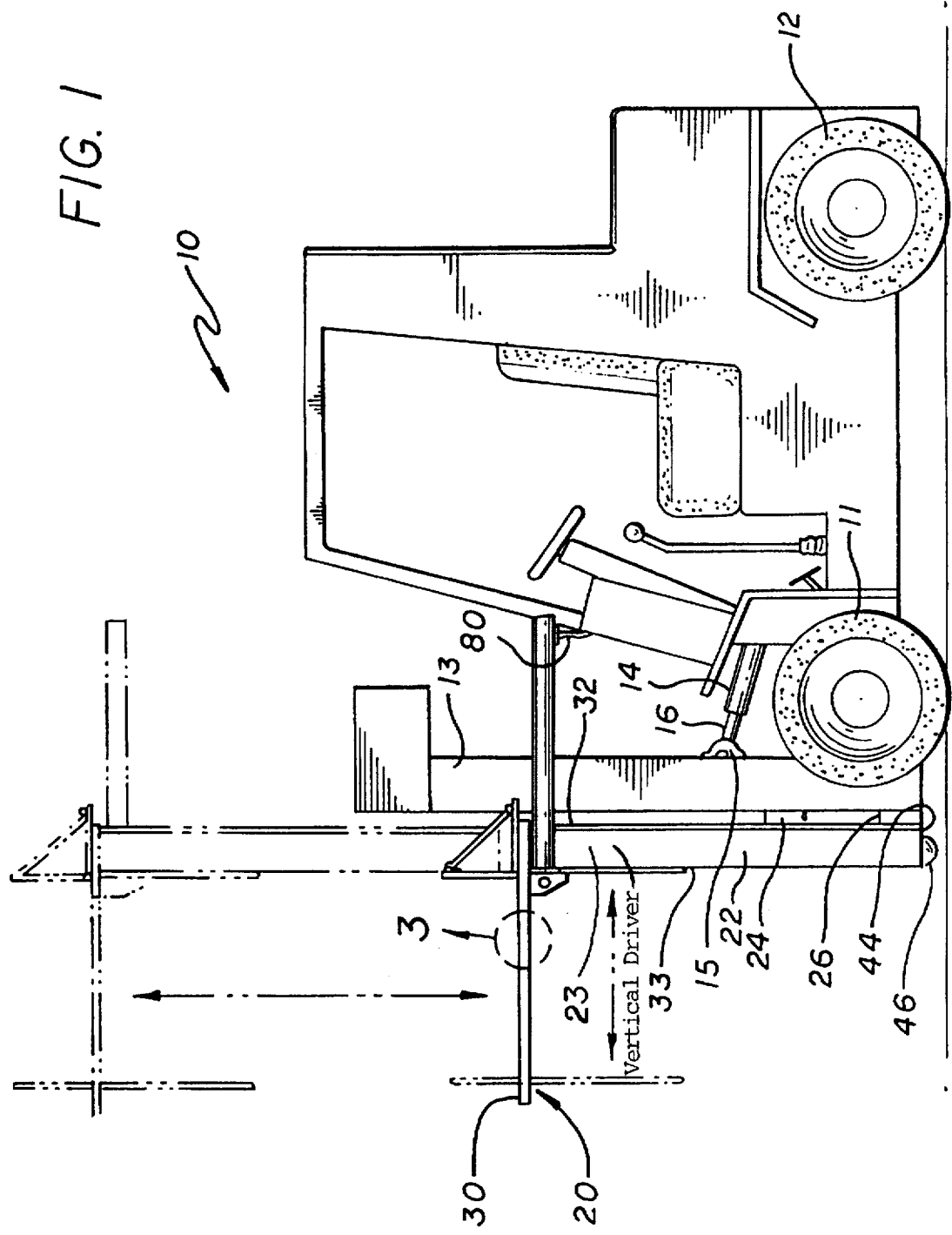

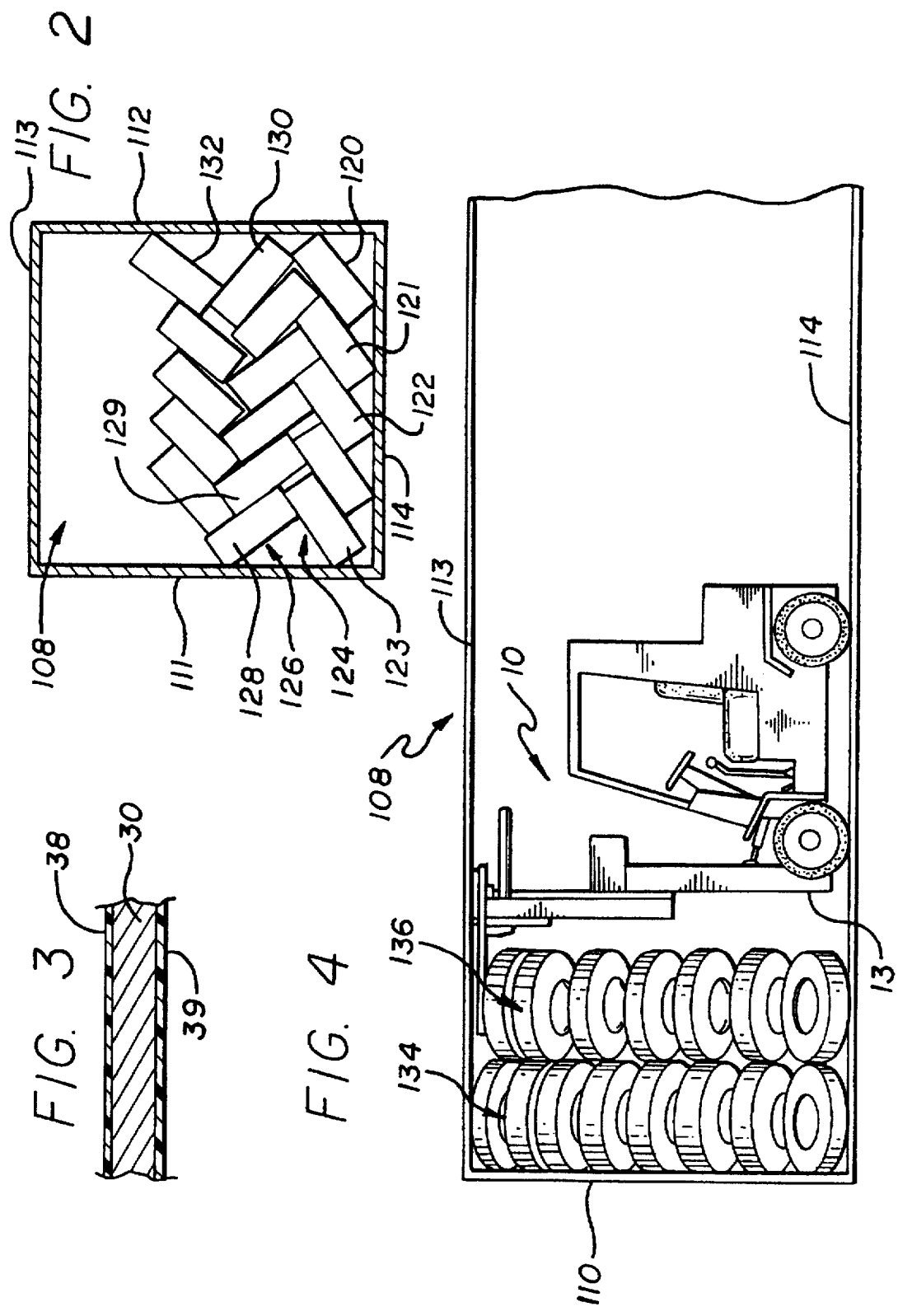

DEVICE FOR COMPRESSING TIRES FOR SHIPMENT IN CONTAINERS

BACKGROUND OF THE INVENTION

1. Field of the Invention

The present invention relates to a device for compressing a load of tires or other compressible material for improving the load density of compressible materials loaded in a shipping container.

2. Related Application

This application is a continuation of U.S. application Ser. No. 08/299,742, filed Sep. 1, 1994, now Pat. No. 5,544,578.

3. State of the Art

Tires must be shipped from factories to warehouses and distributors. Typical load densities for tires shipped in a freight container are quite low. That is, although a passenger tire may be 2' (0.3 m) (metric equivalents are approximate) in diameter and 6" (15 cm) wide, the tire volume is mostly air.

How tires are loaded in the container affects the amount of unused space in a load of tires. It is generally believed that loading tires in a herringbone pattern maximizes load density. In a herringbone pattern, which FIG. 2 shows, a first tire is either laid flat (i.e., horizontal) or propped at an angle against the side wall in the front corner of a shipping container floor (as FIG. 2 shows). If the first tire is laid flat, the next tire leans against the first tire at an angle. If the first tire is propped at an angle against the wall, the next tire is placed parallel to the first. The third tire is then placed parallel to the second, and the process is repeated until the last tire reaches the other front corner to complete a first row of tires.

A second row is mounted above the first row, but each tire in the second row is angled in the opposite direction to the angle of the tires in the first row. Additional rows are added until the load reaches the top of the container, thus completing a stack or column. Next, a second row behind the first row is started, and a new herringbone pattern is made. This continues with piled rows continuing to the back of the container until the container is filled.

U.S. Pat. No. 4,777,781 (1988) and U.S. Pat. No. 4,920,729 (1990), both to Doster et al., disclose devices for compressing tires vertically to improve load density. Both devices install themselves in place before any tires are stacked in the shipping container. When the herringbone pattern reaches about ⅔ or ¾ to the top of the container, a hydraulic ram puches or pulls a plate over the stack down on the top row of tires of one stack. The plate thus compresses the rows below.

In the earlier patent, the compression plate is first raised to the ceiling after the tug is clamped to the ceiling but before any tires are stacked in the container. The later patent is mounted on a machine that is not a forklift, tug or other standard machine. In both devices, while the stack of tires remain compressed, other tires are loaded above the plate. The hydraulics then push the plate (or what the patent calls the "wedge") upward, which partially relieves some of the compression on the tires of the stack below the wedge and simultaneously compresses partially the tires above the wedge. When the load above and below is approximately equal, the wedge is removed from between two rows. A pusher next to the wedge holds the rows above and below the wedge while the wedge is removed. The process is repeated for all subsequent stacks.

One problem of the just-described device is the use of a two way driver for moving the wedge up and down. Because the system uses hydraulics to compress the tires below the wedge, the wedge must push against the compressed tires. Those compressed tires exert an opposite force on the wedge. To prevent that opposite force from lifting the wedge and the entire device, the device needs an overhead frame to contact the container ceiling for supporting the device between the container floor and ceiling. The overhead frame prevents the tires from pushing the entire device upward. The mechanism that moves the overhead frame against the ceiling complicates the device, however. Also, having two-way, hydraulically driven movement makes this device more complex and subject to increased maintenance expenses.

Further, the amount that the device compresses tires below the wedge can vary with different operators. An operator using the device's hydraulics may over- or under-compress the tires. Over-compression may damage tires. Too little compression results in insufficient volume reduction.

When the wedge of the prior art device is removed from the rows of tires, there is a tendency for the tire stack to bow outward or fall over. The prior art holds the rows of tires immediately above and below the wedge as the wedge is removed, but nothing secures the rows lower in the stack.

In U.S. Pat. No. 4,777,781, where the compression plate is first raised to the ceiling, loaders must work under the plate and in front of the machine. This is undiserable.

SUMMARY OF THE INVENTION

An object of the present invention is to disclose an improved tire load compression system. Specifically, one object is to make a more simple system. The fixture mounts on standard forklifts without any special attachments. The forklift supplies all operating forces: lift, steering and hydraulic pressure and controls. Forklifts also have a tilt mechanism to angle the support frame, compression platen and pusher plates to aid in holding the stacks straight while compressing the tires and to push the compressed stacks of tires together to increase overall load density.

Also, by relying on the weight of the fixture that contacts the tires to compress the tire stack, the system can utilize a single hydraulic cylinder or other drive mechanism only for driving the fixture above the load of tires. Thereafter, when the upward force is relieved, the weight of the fixture acting through a platen or horizontal shelf above the stack compresses the stack of tires. By choosing the appropriate fixture weight, one obtains better control of the compression. Also, the device's weight can be modified by adding or subtracting weight to change the compression for different sizes and types of tires.

When using a drive mechanism to pull the fixture downward, the machine can apply too much force on the tire stack, in which case, some tires could be damaged. If the device fails to apply enough force, the load density is decreased. Also by relying only on fixture weight as applicants do, it is unnecessary in the present invention to have a complex overhead frame pushing against the top of the container to hold the device in place vertically as it applies force on the tire stack.

Another object of the present invention is to disclose and provide an improved system for removing the platen from between the two adjacent rows of tires. The present invention uses a pusher plate depending from the compression platen or shelf to hold several rows of tires immediately below the platen. This pusher plate extends downward in front of several rows. That pusher plate is mounted next to the device's support frame, and that frame also secures tires below the pusher plate.

The pusher plate slides in slots in the platen and is pushed against the tires by a hydraulic ram. When the stack is full and the fixture raises upward to equalize the compression above and below the platen, a ram pushes on the pusher plate against the stack of tires. Because the other side of the hydraulic ram connects to a forklift, and the platen also does not move horizontally relative to the forklift, force on the pusher plate pushes the forklift back, away from the stack of the tires, which in turn withdraws the platen from between the two adjacent rows.

Another feature of the present invention is the use of a hinged pusher plate above the platen. That hinged plate is the top-most part on the fixture. By pivoting that pusher plate down so that it lies horizontally on the top of the platen, the forklift can raise the platen almost to the container ceiling. Then, when the fixture lowers to compress the lower rows of tires and then additional tires are placed above the platen, the hinged pusher platen can be pivoted vertically and then locked. That plate in its locked position holds the tires above the platen as the platen is withdrawn.

BRIEF DESCRIPTION OF THE DRAWINGS

FIG. 1 is a side elevation of the tire load compression fixture mounted on a forklift.

FIG. 2, which was already discussed briefly, shows an end schematic view of tires loaded in a herringbone pattern in a container.

FIG. 3 is a cross-section of detail 3 in FIG. 1 of the platen.

FIGS. 4, 5 and 6 are side elevations of the load compression system of the present invention showing the device at different stages of operation within a container.

DETAILED DESCRIPTION OF THE PREFERRED EMBODIMENT

Figure 5:
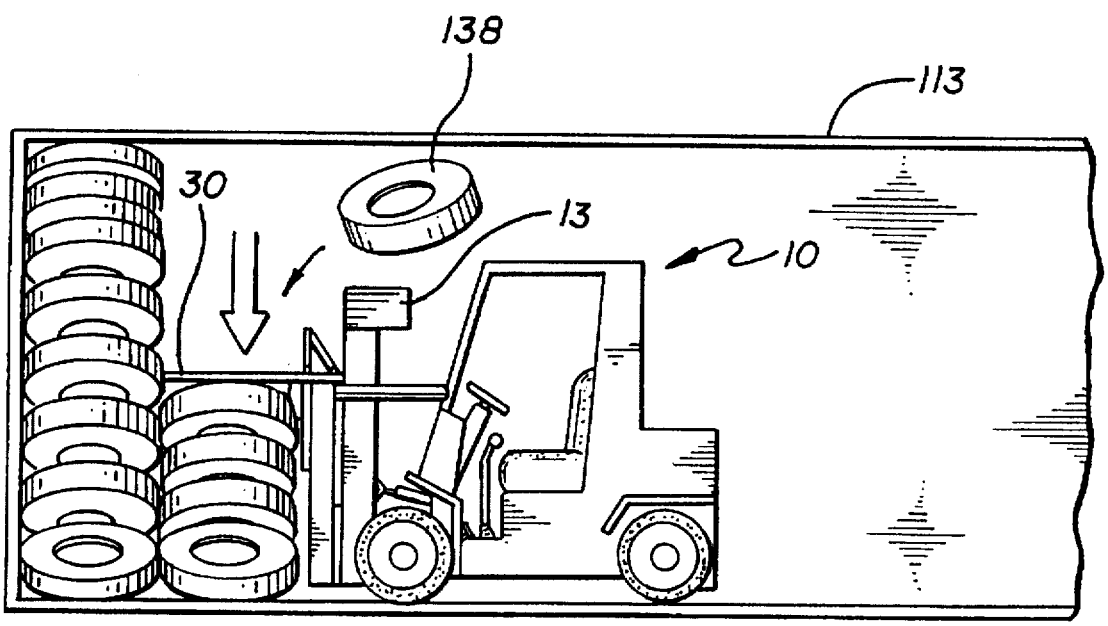

The exemplary embodiment of the tire load compression fixture of the present invention is shown generally at 20 (FIG. 1). The exemplary fixture mounts on a forklift 10. The forklift is motorized, and travels on front wheels 11 and rear wheels 12 (FIG. 1). A steering mechanism (not shown) allows the forklift to maneuver.

As is conventional, the forklift has a front mast 13 (FIG. 1). Typically, mast 13 has a hydraulic cylinder, which the forklift motor powers. The mast would connect conventionally to forks. The present invention removes those forks and attaches instead fixture 20 (FIG. 1) of the present invention. A hydraulic cylinder 14 applies force on fitting 15 on mast 13. By adjusting the distance that arm 16 extends out of cylinder 14, the angle of mast 13 can be changed. This tilt mechanism facilitates the compression of the tire stack by changing the platen's angle.

Tire load compression fitting 20 includes a support frame 22 (FIG. 1). Brackets 24 and 26 (FIG. 1) attach support frame 22 to mast 13. The connection between the support frame and the mast is similar to that used to attach conventional forks to the mast. A vertical driver 23 in the form of a hydraulic cylinder (schematically shown) in mast 13 connects to a carriage in the mast to which the braces are attached. The hydraulic cylinder can raise and lower support frame 22. As will be appreciated, because other items of the compression fixture 20 are fixed vertically to support frame 22, fixture 20 moves vertically with support frame 22.

In the exemplary embodiment, support frame 22 is formed from two plates 32 and 33 of ½" (1.3 cm) thick, 50" (1.3 m) tall and 6.5' (2 m) wide steel plate. Internal C-channels (not shown) and edge C-channels 36 and 37 (FIG. 7) separate and hold plates 32 and 33 together. In the exemplary embodiment, these and other steel pads are welded together. Edge C-channels 36 and 37 also close the sides of support frame 22.

Figure 7:
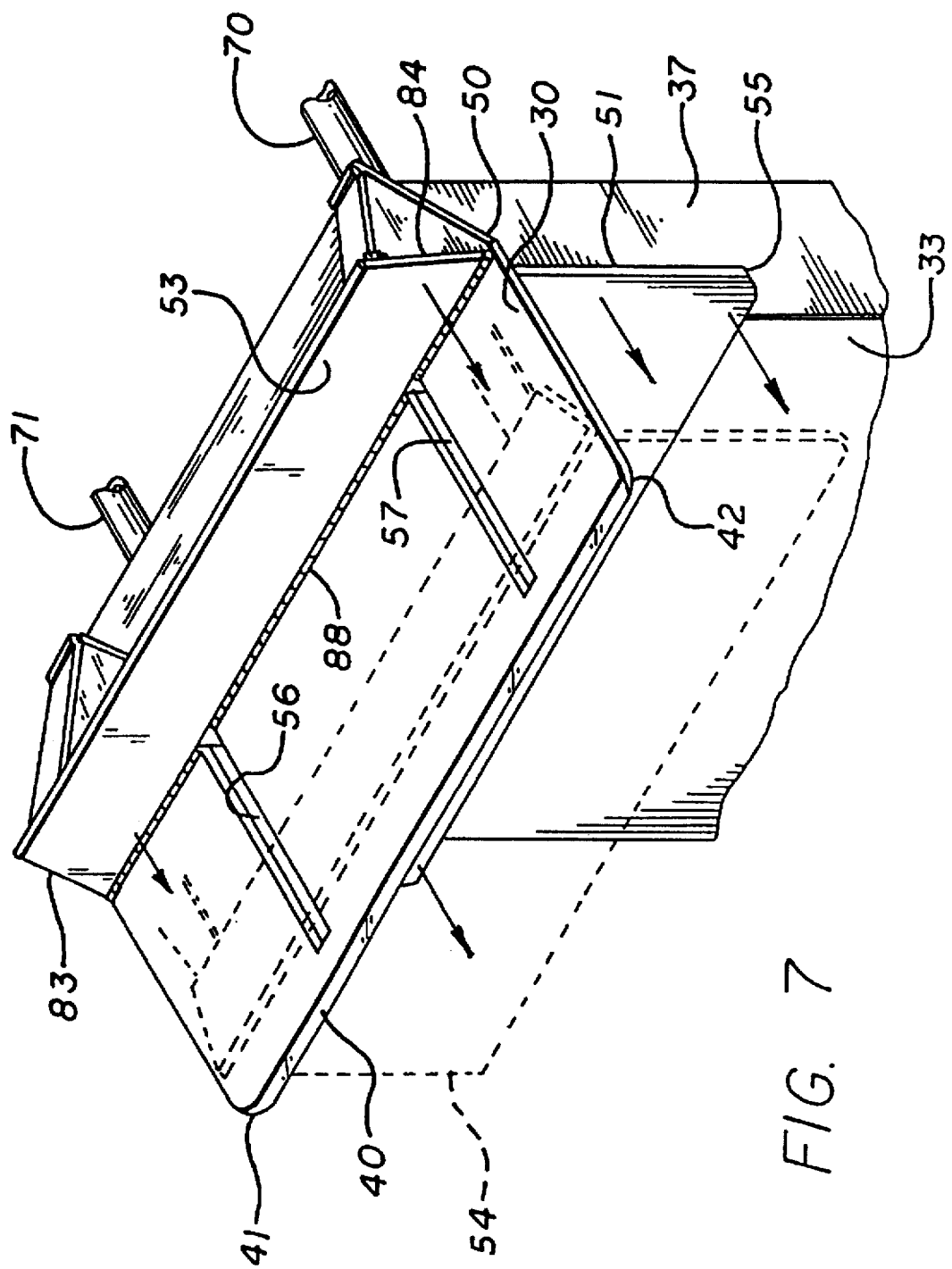
FIG. 7 is a perspective view of the load compression fixture of the present invention.
Figure 8:
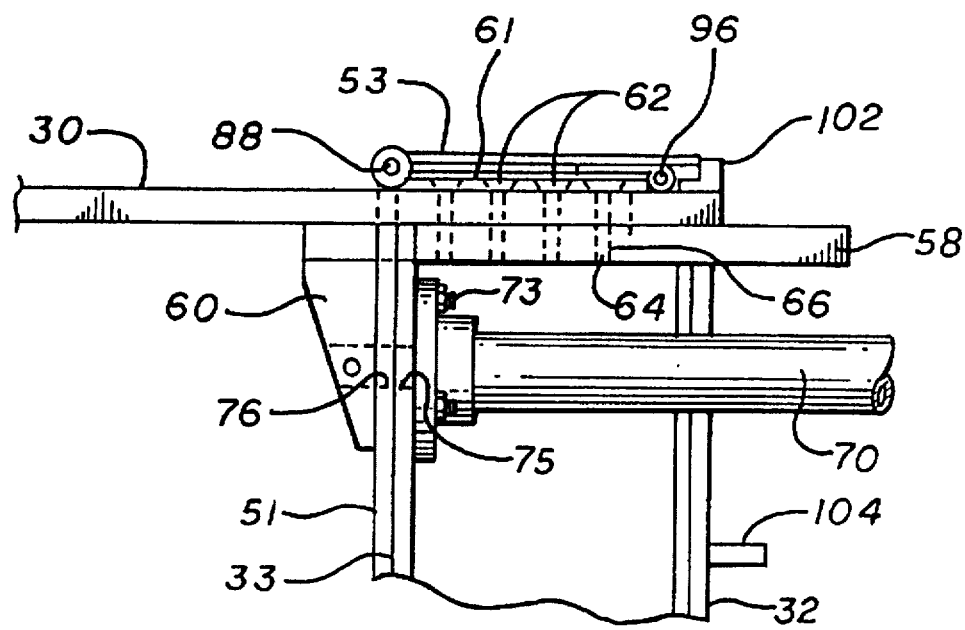
FIG. 8 is a side view of the upper part of the fixture of the present invention with the upper pusher plate in its lower orientation.
Figure 9:
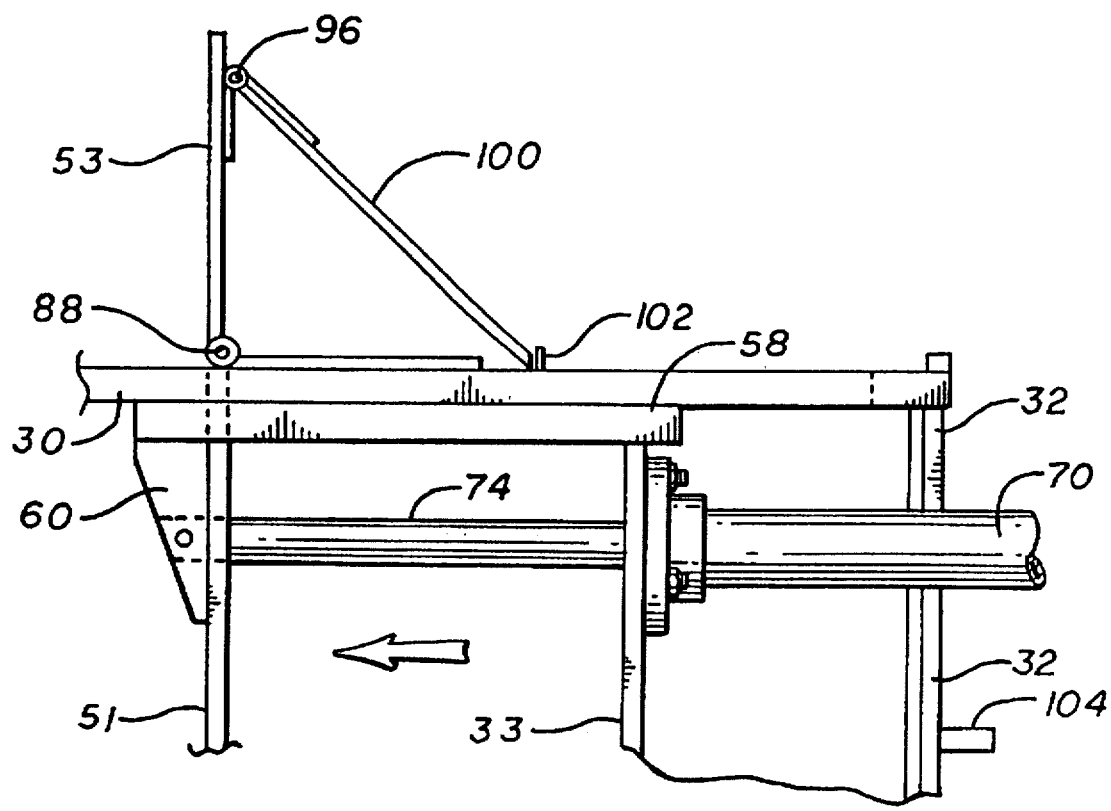
FIG. 9 is a view similar to FIG. 8 but with the upper pusher plate in the elevated, upright orientation.

A compression platen extends in a horizontal plane in a direction away from the fork lift 10. In the exemplary embodiment, the rear of compression platen 30 is welded to the top of support frames 32 and 33 (FIGS. 7–9). Platen 30 extends forward (i.e., away from the forklift 10) of support frame 22.

Compression platen or shelf 30 in the exemplary embodiment is formed of 1" (2.5 cm) thick steel, approximately 7' (2.1 m) wide and 40½" (1 m) deep. The platen's width is about 8" (20 cm) less than the inside width of a conventional shipping container. The spacing, about 4" (10 cm) on each side of the platen and the container walls, allows the forklift some maneuvering within the container. The resulting available space between the edges of the platen and the container walls is narrow enough to prevent a tire to pass between the platen's side edges and the container side walls. Therefore, all tires in the stack below the platen will be compressed.

Platen 30's front edge 40 is tapered (FIG. 7) for a smooth transition when the platen is removed from the tire stack (as discussed below). Platen 30 also has rounded corners 41 and 42 to eliminate pointed edges.

Platen 30 in the exemplary embodiment also has smooth top and bottom plastic sheets 38 and 39 (FIG. 3). The plastic—preferably polyethylene or other low friction plastics—reduces friction from the tires pushing upward on the bottom and downward from the top of platen 30. Without friction-reducing plastic, the friction between the tires and the platen will be increased, but the device still will function well without plastic.

Quarter inch (0.6 cm) thick plate steel sheet 44 spans the bottom of support plates 32 and 33 of support frame 22. Additionally, half of a 3" double, extra strong pipe 46 is welded to the bottom of plate 44 (FIG. 1). The pipe's rounded bottom protects the tires being compressed from catching on the bottom of support frame 22. Also the rounded bottom can rest on the floor of a container, the warehouse floor or parking lot and prevents damage both to the support frame and to the floor or lot.

A pusher plate extends in a plane perpendicular to the plane of the compression platen. The pusher plate extends both above and below compression platen 30. In the exemplary embodiment, pusher plate 50 comprises lower pusher plate 51 and upper pusher plate 53. Also in the exemplary embodiment, lower pusher plate 51, which extends below platen 30 in the exemplary embodiment is 6.5' (2 m) wide and 1.5' (0.5 m) high. Lower pusher plate 51 also is formed of (½"cm) steel. Bottom corners 54 and 55 of lower pusher plate 51 (FIG. 7) are radiused to eliminate sharp corners. Compression platen 30 in its exemplary configuration has two spaced parallel slots, 56 and 57 (FIG. 7).

The top of lower pusher plate 51 is welded to slide fitting 58 (FIGS. 8 and 9). Slide fitting 58 is formed of 1" (2.5 cm) thick ×8" (20 cm) wide ×15" (38 cm) long steel plate. Brace 60 (FIGS. 8 and 9) is welded to the front face of lower pusher plate 51 and to the bottom front of slide fitting 58.

Plate 61 has four generally evenly spaced, tapered screw holes 62 in two rows (FIG. 8). These holes are aligned with threaded bores 64 through slide fitting 58. Taper head bolts 66 pass through tapered screw holes 62 and slot 57 (and slot 56) and are threaded into threaded bores 64 (FIG. 8). The bolts, therefore, secure plate 61 and slide fitting 58 together. Although not shown, small plastic sliders, approximately the width of each slot 56 and 57, are be interposed between plate 61 and slide fitting 58 within each slot. The sliders are provided with bores through which bolts 66 pass.

A horizontal driver, which includes hydraulic cylinder 70 attaches to the back of front plate 33 of support frame 22 (FIGS. 8 and 9). FIG. 7 shows a second hydraulic cylinder 71, which also is part of the horizontal driver. Bolts 73 secure cylinder fitting 72 to plate 33. Piston rod 74 moves into and out of cylinder 70 through hydraulic forces. Piston rod 74 extends through openings 75 and 76 in front support plate 33 and lower pusher plate 51 and threads into brace 60 to secure piston rod 74 to the brace. As discussed in more detail below, movement of piston rod 74 by cylinder 70 acting on brace 60 moves lower pusher plate 51. Hydraulic line 80 (FIG. 1) which connects to the hydraulic system (not shown) of forklift 10 controls the movement of piston rod 74 relative to cylinder 70.

Upper pusher plate 53 is hinged relative to plate 61 (FIGS. 8 and 9). As FIG. 7 shows, pusher plate 53 is the same 7' (2.1 m) width as wide as compression platen 30. Side edges 83 and 84 of upper pusher plate 53 are tapered inward. A 6' (1.8 m) hinge 88 is attached to plate 61 and upper upper pusher plate 53 (FIGS. 8 and 9). Another hinge 96 (FIGS. 8 and 9), which is attached to upper pusher plate 53, also attaches to brace 100. Brace 100 is formed of ¼" steel plate, which is approximately 2.5" (5.6 cm.) wide near hinge 96, and it tappers to about 2.5" (6.3 cm.) wide at its opposite end. The brace is about 6.5" (16.5 cm) long.

Hinge 88 permits upper pusher plate 53 to pivot between a generally vertical position aligned with lower pusher plate 51 (FIG. 9) and an unaligned position, horizontal in the exemplary embodiment (FIG. 8). When the operator wants to release upper plate 53 to its upright orientation, he or she manually pivots the pusher plate about hinge 88 to that position. The operator then pivots brace 100 about hinge 96 and places the opposite end against stop 102. Stop 102 holding brace 100 resists any force backwards (to the right in FIG. 9) on upper pusher plate 53.

To release upper pusher plate 53 from the upright position, the operator pivots the pusher plate forward somewhat to allow brace 100 to be released from stop 102. Upon its release, upper pusher plate 53 is then rotated clockwise to the horizontal position (FIG. 8). Brace 100 also is rotated about hinge 96 to be aligned with upper pusher plate 53 (FIG. 8). As that figure shows, pusher plate 53 does not extend upward significantly above compression plated 30. As will be discussed below, this arrangement allows the compression platen to be raised almost to the top of a container without interfering with the ceiling of the container.

The rear wall 32 of support frame 22 is provided with two steps or platforms 104 on either side of support frame 22 (FIG. 9). The platforms allow workers to stand on the support frame 22 whether the frame is near the ground or in an elevated position.

The tire compression device of the present invention operates as follows. Tires are conventionally loaded in a herringbone pattern within container 108 (FIG. 2). Container 108 has a rear wall 110 (FIG. 4), side walls 111 and 112, a ceiling 113 and a base 114. Each container wall is about 7'8" to 8'2" (2.3 m to 2.5 m) wide. The rear end of the container (right side in FIG. 4) has rear doom (not shown) allowing access into the container.

During normal loading operation, forklift 10 is not in container 108. This is advantageous because the loading crew stacks tires in the container before the forklift enters the container. As a safety feature, the crew (except the forklift operator) also is away from the tires as the tires are being compressed. Tires are carried or rolled toward container back wall 110. A first tire 120 (FIG. 2) is propped against one of the side walls (in this case wall 112) and against rear wall 110. A loader then puts the next tire 121 against the first tire 120 and repeats the process with tire 122 and other tires until tire 123 reaches the other side wall 111. Those tires form a first row 124. As an alternative loading method, the first tire may be laid horizontally against sidewall 112 and rear wall 110. The adjacent tire is then leaned partially over the first tire. The remaining tires in the first row assume approximately the same angle as the second tire.

After the loader completes the first row 124, he or she then begins the second row 126. First, tire 128 is placed perpendicular to the tires in the first row 124. Tire 129 is then placed over tire 128, and the tire loading process is repeated until tire 130 reaches end wall 112. In a similar manner, row 132 is added. These rows build a first stack 134 (FIG. 4) along rear wall 110 of container 108.

Figure 6:
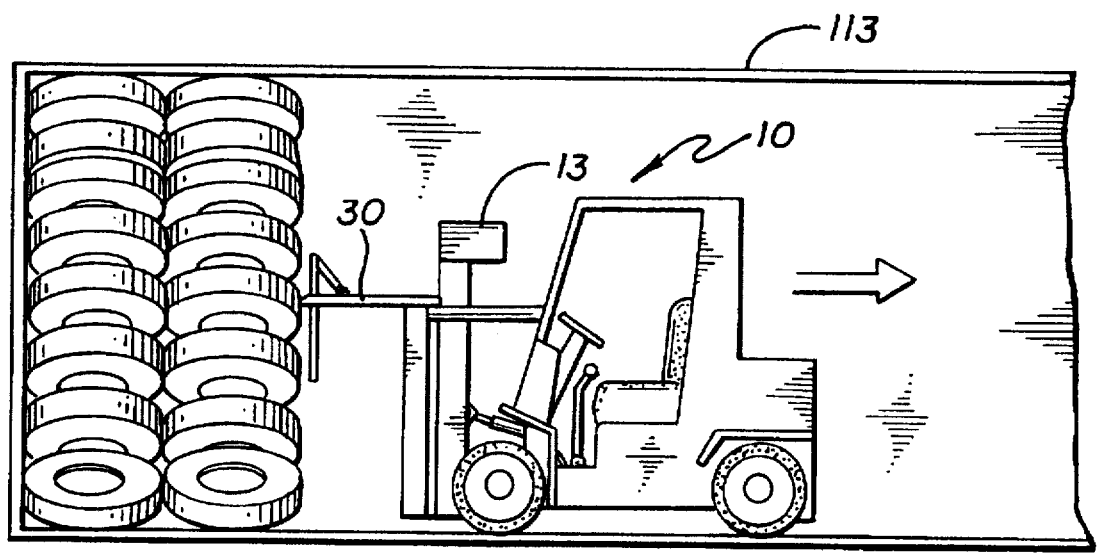

When the herringbone pattern reaches close to ceiling 113, the loaders leave the container, and an operator drives forklift 10 into container 108. After first stack 134 is loaded to the top of the container, it is compressed. The compression operation in the drawings is shown acting on a second stack 136, which is stacked in a similar manner to stack 134. In FIGS. 4-6, stack 134 is already compressed, and stack 136 is about to be compressed in the following manner. After the top row of tires in stack 136 reaches just below the ceiling 113, an operator drives forklift 10 into container 108. The mechanism within mast 13 for raising the fixture raises the fixture until it is very close to the ceiling in the FIG. 4 position. Upper pusher plate 53 is in its horizontal orientation (FIG. 8). Because that position allows compression platen 30 to be very close to ceiling 113 without any part of fixture 20 interfering with the ceiling, the tires can be loaded almost to the ceiling.

In FIG. 5, the weight of fixture 20 is released to compress the tires in second stack 136. The fixture weights between 3,500 and 4,000 lbs. (1,590–2,040 kg), and it compresses the tires to about half their original volume. The fixture can achieve different compression ratios through changes in its weight. Its is anticipated that the user could add or remove additional weight to allow for the proper amount of compression for each type and size of tire. FIG. 5 shows approximately 50% reduction in volume as the fixture comes down from the 9' (2.7 m) ceiling approximately 4.5' (1.4 m).

The loader begins loading additional tires, e.g., tire 138 (FIG. 5) in a herringbone pattern above platen 30. When the stack reaches ceiling 113, the operator or loader then pivots upper pusher plate 53 to its upright (FIG. 8) position. The lift cylinder in mast 13 moves fixture 20 upward, against the force of gravity, to relieve some of the compression on the tires below platen 30 and to compress the tires above the platen until the upward and downward forces on the platen are approximately equal.

After the vertical forces are balanced, the platen is then removed from between adjacent rows of tires. To accomplish removal, hydraulic cylinders 70 and 71 are activated.

The piston rods 74 acting on brackets 60 moves pusher plate 50 (i.e., upper pusher 53 and lower pusher plate 51) to the left (FIG. 9). Because upper pusher plate 53 is in its upright orientation, it too pushes against the first row of tires above platen 30.

While cylinder rods 74 push the pusher plate 50 to the left, the brakes of forklift 10 are released. The pusher plate, which acts against the tires, remains stationary relative to the tires as compression platen 30 withdraws from between the two adjacent rows of tires. The compression platen's movement pushes forklift 10 rearward (FIG. 6) until the tires release the platen. Hydraulic cylinders 70 and 71 then retract pusher plate to its right-most orientation. The driver then drives forklift 10 out of container 108, and loaders begin stacking a third stack of tires in a similar manner.

As FIG. 4 shows, as the tires in stack 136 are being compressed, the lower pusher plate 51 and front wall 33 of support frame 22 are close to or against the rows of tires immediately below platen 30. This prevents the tires from bowing outward or falling out of the stack. It also pushes the stacks of tires closer together horizontally, which increases the overall tire load density.

As numerous modifications and alternate embodiments will occur to those skilled in the art, it is intended that the invention is limited only in terms of the appended claims.

We claim:

1. A device for compressing tires in a shipping container comprising:
    a. a support frame attached to a fork lift;
    b. a fixture attached to and moveable vertically upward along the support frame and being released so that the fixture's weight compresses any tires below the compression platen, the fixture comprising:
        i. a compression platen extending in a general horizontal plane, the compression platen having a slot extending through the compression platen;
        ii. a pusher plate extending in a plane perpendicular to the plane of the compression platen, the pusher plate having a lower pusher plate depending from the compression platen and an upper pusher plate extending above the compression platen, the pusher plate being mounted in the slot of the compression platen for movement along the slot of the compression platen;
        iii. the fixture being of sufficient weight to compress tires stacked below the compression platen; and
    c. a horizontal driver connected to the pusher plate for pushing the pusher plate away from the support frame.

2. The device for compressing items of claim 1, wherein the upper pusher plate is mounted for pivoting between an upright orientation aligned with the lower pusher plate and an orientation that is angled to the lower pusher plate.

3. A fixture for compressing tires in a shipping container, the fixture being attachable to a vehicle, the fixture comprising:
    a. a compression platen extending in a general horizontal plane, the compression platen having a slot extending through the compression platen;
    b. a pusher plate extending in a plane perpendicular to the plane of the compression platen, the pusher plate having a lower pusher plate depending from the compression platen and an upper pusher plate extending above the compression platen, the pusher plate being mounted in the slot of the compression platen for movement along the slot of the compression platen;
    c. the fixture weighing at least 3,500 pounds.

4. The fixture for compressing tires of claim 3, wherein the upper pusher plate is mounted for pivoting between an upright orientation aligned with the lower pusher plate and an orientation that is angled to the lower pusher plate.

5. A device for compressing items in a shipping container comprising:
    a. a vehicle;
    b. a support frame attached to the vehicle;
    c. a fixture attached to and moveable vertically along the support frame, the fixture comprising:
        i. a compression platen extending in a general horizontal plane, the compression platen having a slot extending through the compression platen; and
        ii. a pusher plate extending above and below the compression platen and in a plane perpendicular to the plane of the compression platen, the pusher plate being mounted in the slot of the compression platen for movement along the slot of the compression platen;
    d. a horizontal driver connected to the pusher plate for pushing the pusher plate away from the support frame; and
    e. a vertical driver on the fork lift and connected to the fixture for moving the fixture upwards relative to the support frame and releasing the fixture so that the fixture's weight compresses any tires below the compression platen.

6. The device for compressing items of claim 5, wherein the portion of the pusher plate that is below the compression platen is a lower pusher plate depending from the compression platen and the portion of the pusher plate that is above the compression platen is an upper pusher plate extending above the compression platen, the upper pusher plate pivoting between an upright orientation aligned with the lower pusher plate and an orientation that is angled to the lower pusher plate.

7. The device for compressing items of claim 6, further comprising a stop on the upper pusher plate securing the upper pusher plate in the upright orientation.

* * * * *